United States Patent [19]

Chelsea

[11] Patent Number: 4,882,453
[45] Date of Patent: Nov. 21, 1989

[54] WIRE MANAGEMENT ASSEMBLY

[75] Inventor: Daniel B. Chelsea, New York, N.Y.

[73] Assignee: The Shaw-Walker Company, Muskegon, Mich.

[21] Appl. No.: 253,572

[22] Filed: Oct. 5, 1988

[51] Int. Cl.⁴ .............................................. H02G 3/24
[52] U.S. Cl. ..................................... 174/48; 174/68.3
[58] Field of Search ................ 174/48, 49, 68.3, 70 C, 174/72 A, 72 C; 52/220, 221; 312/223

[56] References Cited

U.S. PATENT DOCUMENTS

| | | | |
|---|---|---|---|
| 1,794,102 | 2/1931 | Comins | 174/68.3 X |
| 3,759,297 | 9/1973 | Anderson et al. | 174/48 X |
| 4,603,229 | 7/1986 | Menchetti | 174/48 |

FOREIGN PATENT DOCUMENTS 2408095 8/1975 Fed. Rep. of Germany ..... 174/68.3

*Primary Examiner*—Arthur T. Grimley
*Assistant Examiner*—David A. Tone
*Attorney, Agent, or Firm*—Kinzer, Plyer, Dorn, McEachran & Jambor

[57] ABSTRACT

A wire management assembly for mounting on a wall or panel of a work station or office for supporting and concealing communication wires, power plug-in cords and extension cords of electrical equipment and devices. It consists of an extruded aluminum housing having a downwardly facing opening for receiving wires to be supported in the housing. Metal clips connect to the aluminum housing and in turn are connected to brackets which mount in slots formed in standards located at the ends of the panels. A cover is provided for mounting on the aluminum housing and to extend downwardly to the work surface to conceal wires and equipment located on the work surface below the aluminum housing. The cover has a hook that fits into a groove formed in the aluminum housing to hingedly lock the cover to the housing.

5 Claims, 2 Drawing Sheets

U.S. Patent  Nov. 21, 1989  Sheet 1 of 2  4,882,453
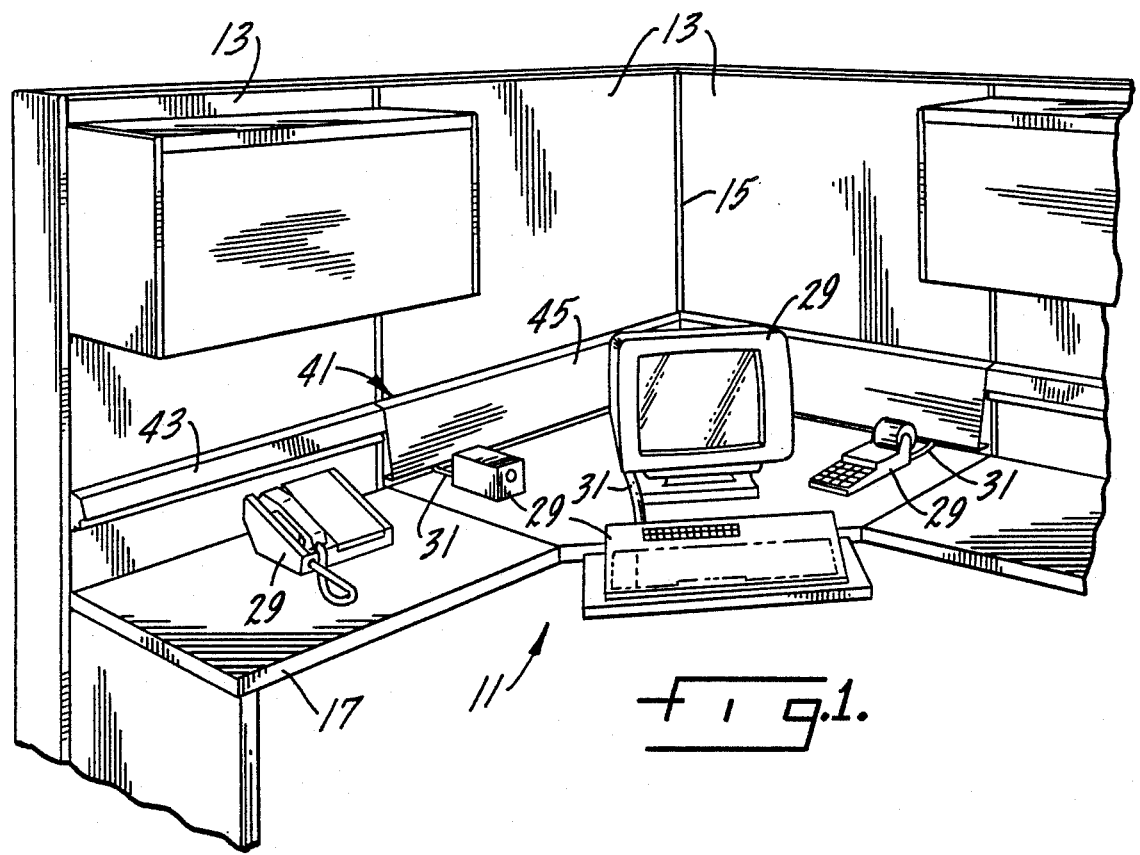
Fig. 1.
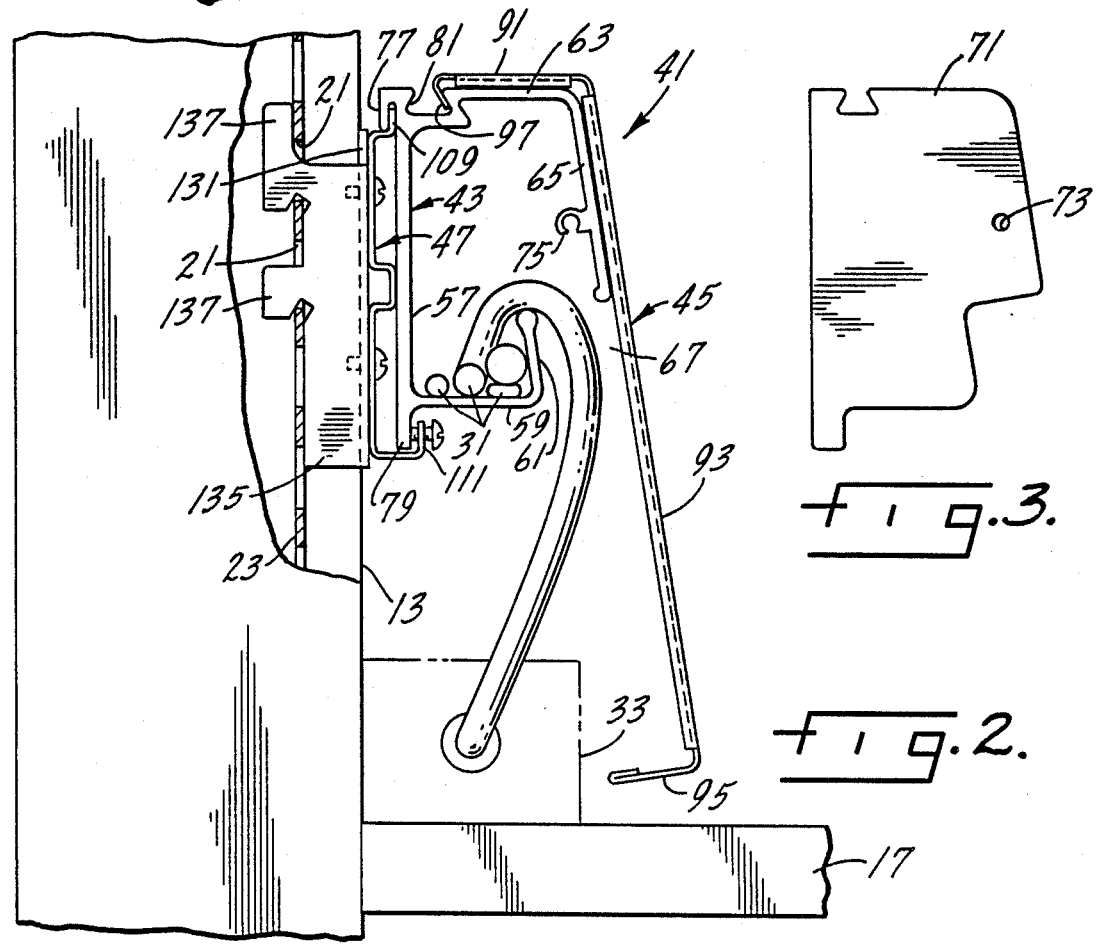
Fig. 3.
Fig. 2.

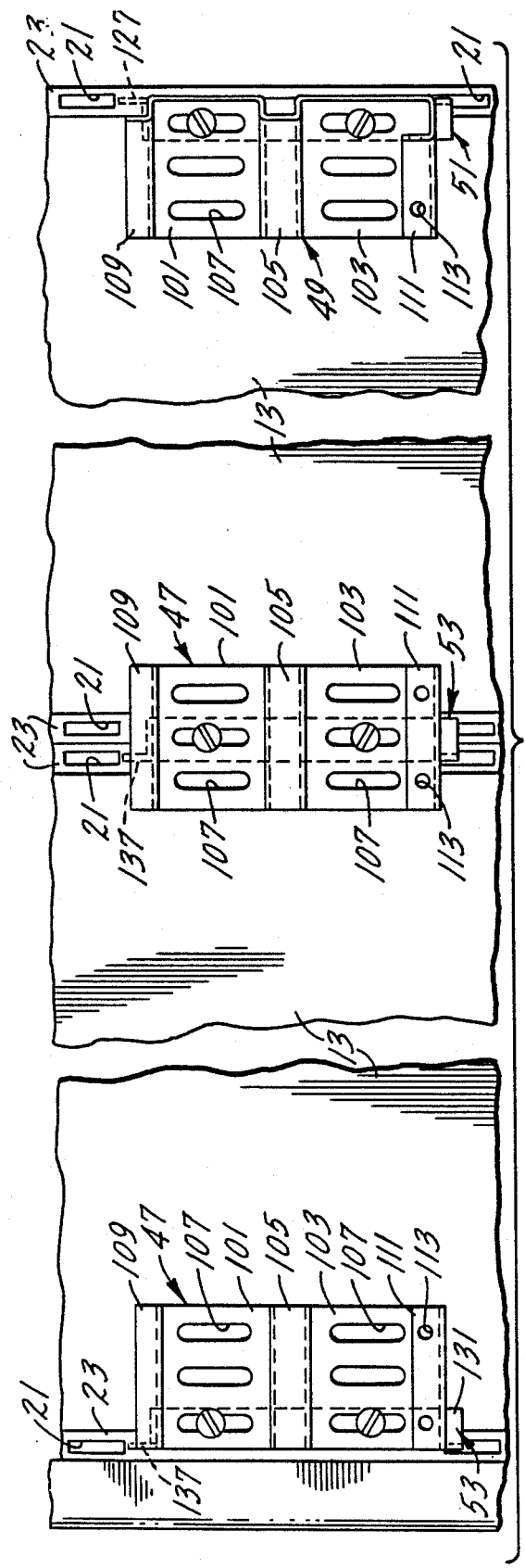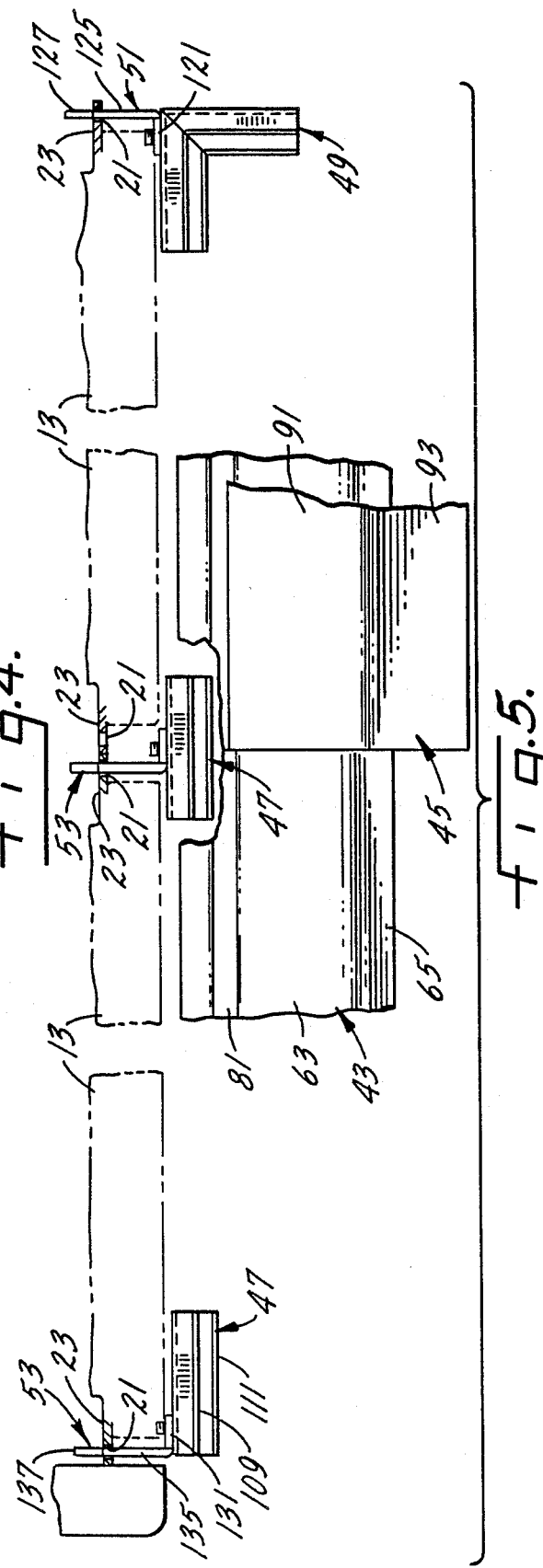

WIRE MANAGEMENT ASSEMBLY

BACKGROUND AND SUMMARY OF THE INVENTION

This invention is concerned with a wire management assembly for supporting and concealing communication wires, power plugs and extension cords for electrical equipment. The proliferation of electrical and electronic equipment in offices has created the problem of wire control. The tangled web of wires which extend from computers, telephones, typewriters, clocks, radios, monitors, calculators, etc. must be channeled not only for efficient use of the work space but also for safety and aesthetic reasons. Therefore, this invention is particularly concerned with a wire management assembly that is adapted for installation in an open office partition system work station, but is also usable in any work station or office to eliminate the unsightly appearance, dangers and inefficiencies created by the myriad of wires which accompany electrical and electronic equipment in today's modern office.

An object of this invention is a wire management assembly which has an optional cover which also conceals electrical outlets, surge protectors, multiple outlet strips, etc. while still permitting easy access to these devices for the insertion and removal of electric plugs and cords and the actuation and shutting off of these devices.

Another object of this invention is a wire management assembly that can be supported on the standards normally provided at the ends of open office partition panels.

Another object of this invention is an optional cover that can be installed on selected portions of the wire management assembly, particularly those portions that have the maximum wire congestion.

Another object of this invention is a cover having a hook-like hinge which attaches the cover to the wire enclosure housing and functions both as a hinge and a hook.

Other objects may be found in the following specification, claims and drawings.

BRIEF DESCRIPTION OF THE DRAWINGS

FIG. 1 is a perspective view showing the installation of the wire management assembly of this invention in an open office partition system work station;

FIG. 2 is an end elevational view with parts removed, others broken away, and some in cross-section or phantom showing the attachment of the wire management assembly to the standard of a partition panel;

FIG. 3 is a plan view of the housing end cover;

FIG. 4 is a front view of mounting clips for the housing attached to brackets installed in slots of panel standards of the panels of the work station of FIG. 1, with parts broken away; and FIG. 5 is a partial top plan view of the mounting clip installation of FIG. 4, with the wire housing and its cover partially shown and the panels shown in phantom.

DESCRIPTION OF THE PREFERRED EMBODIMENT

The work station 11 shown in FIG. 1 of the drawings is a conventional station defined by open office partition system panels 13. In such a work station, the panels form an enclosure having walls extending at right angles to each other, which walls intersect to form a corner 15. As is customary, a work surface or desk 17 is self supporting or is supported by hangers (not shown) which fit into slots 21 FIGS. 2 and 4) in the standards 23 formed at the ends of each office partition panel 13. It is conventional for electrical, telephone and computer outlets to be installed in open office partition panels 13 usually above the work surface 17 where they can be conveniently reached, and for ease of description in this specification, they will be collectively referred to as outlets.

The myriad of office appliances which include such devices as computers, typewriters, printers, calculators, pencil sharpeners, clocks, radios, monitors, etc. are supported on the typical work surface 17, and for convenience of description they will be referred to as office appliances 29 in this specification. Power plugs, cords and communication wires 31 of various types extend from these office appliances to the outlets. In addition, for certain types of equipment, surge protectors and multiple outlet strips 33 are provided, with the surge protectors and outlet strips usually having power plugs which are inserted in the electrical outlets and then to the office appliances. All of these wires and devices are located on the work surface 17 and create the tangle of wires found in the modern office and especially the modern work station. While this invention is being described in connection with its installation in the open office partition work station, it should be understood and appreciated that it is also applicable to and usable in any type of office or other situation in which it is necessary or desirable to organize and/or conceal the myriad of wires used in connection with modern office equipment. The wire management assembly of this invention can be mounted on any vertical surface including the front edge or the back surface of a desk and is not limited to mounting on the standards of open office partition panels.

The wire management assembly 41 of this invention includes an extruded aluminum housing 43. Provided as an optional attachment on portions of the housing 43 is a metal cover 45 which is hung on the cover and extends downwardly well beyond the aluminum housing 43. The purpose of this cover is to conceal electrical outlets and devices such as surge protectors and multiple outlet strips which would be supported on the work surface 17 below the extruded aluminum housing 43. Thus, it is not necessary to have the metal cover extending the entire longitudinal extent of the aluminum housing, but rather these covers can be provided only in areas of heavy concentration of wire or equipment that the users wish to conceal from view. The extruded aluminum housing 43 is attached to the partition panels through means of clips, such as clip 47 (FIG. 4), which will support a straight piece of aluminum housing at the abutment of two in-line partitions and an L-shaped clip 49 which will be attached to the standards of a partition at a right angle corner. The clips are attached to brackets 51 (FIG. 5), which is a right-handed bracket, and bracket 53, which is a left-handed bracket, by screws. The brackets in turn are attached to the standards 23 which are formed as part of the partition panels 13.

The extruded aluminum housing 43 includes a rear wall 57, a bottom wall 59 which has an upturned front lip 61, with the bottom wall and front lip forming a wire support raceway, a top wall 63 and a downwardly extending and outwardly inclined front wall 65 which terminates about level with the upturned front lip 61 of the bottom wall to form a downwardly opening and, therefore, normally concealed opening 67 into the housing 43. The ends of the housing extrusion are open and, unless they abut against a partition or other barrier, will be closed by a metal plate 71 (FIG. 3). The metal plates are fastened to the housing by screws which pass through opening 73 in the plates and into an extrusion 75 formed integrally with the front wall 65 of the housing and on the inside thereof. Also formed integrally with the rear wall 57 is a rearwardly facing, downwardly opening hook 77 which extends the length of the rear wall. The rear wall also extends beyond the bottom wall to form a downwardly extending flange 79. A dovetail-shaped, upwardly open groove 81 is formed in the top wall 63 of the housing adjacent the rear wall 57.

The metal cover 45 is formed from a single sheet of metal cut to any desired length and bent transversely into a structure having a relatively shallow top wall 91, an inclined front wall 93, which is inclined at the same angle as the front wall 65 of the aluminum housing 43, and an in-turned bottom tab 95. A sheet metal hook 97 is formed at the outer edge of the top wall, with the hook bent to the same angle as the wall of the dovetail groove 81 formed in the aluminum housing 43. Thus, as can be clearly seen in FIG. 2 of the drawings, the hook 97 fits into the dovetail groove 81 to lock the cover 45 into position on the aluminum housing and to prevent the cover from being lifted straight up for removal from the aluminum housing. Instead, to disengage the hook from the dovetail groove, it is necessary to pull the bottom tab 95 of the front wall 93 of the cover 45 outwardly when lifting it up to disengage the hook 97 from the dovetail groove 81. The bottom tab 95 of the cover is designed to terminate a short distance above the work surface 17 so that a user can insert a finger or hand for lifting and swinging the cover when access to space behind the cover is desired.

Clips 47 and 49 are formed from a single flat piece of metal bent into a shape having an upper planar surface 101 and a lower planar surface 103. These surfaces are separated by a transverse rib 105. Elongated vertical slots 107 are formed in the two planar surfaces to receive screws which attach the clips to the brackets 51 and 53. An offset flange 109 is formed at the top of the clip and it fits into the downwardly opening hook 77 formed integrally with the aluminum housing 43 to support the housing. A front facing channel 111 is formed at the lower end of the clip to receive the flange 79 of the aluminum housing 43. Openings 113 (FIG. 4) are formed in the face of the channel 111 to receive screws to secure the clip to the lower flange 79 of the aluminum housing 43 to lock it in position. A clip is supported by either a right hand bracket 51 or a left hand bracket 53.

A right hand bracket 51 (FIG. 5) which connects to the right hand side of a clip has a front plate 121 which extends to the left, openings (not shown) in the front plate for receiving screws to fasten to the clip, a side plate 125 that extends rearwardly toward the standards and hooks 127 formed in the side plate that fit into the slots 21 in the standards.

A left hand bracket 53 (FIG. 2) has a front plate 131 which extends to the right when viewed from the front of the bracket, openings (not shown) in the front plate to receive screws to fasten the clip to the bracket, a side plate 135 that extends to the standard 23 and hooks 137 formed in the side plate to fit into the slots 21 in the standards.

The aluminum housing 43 is attached to the wall panel 13 or any vertical supporting surface with its bottom wall 59 located three to four inches above the work surface 17, as shown in FIG. 2. Wires 31 from such devices as computers, printers, typewriters, terminals, consoles, clocks, pencil sharpeners, etc. are inserted in the concealed, downwardly facing opening 67 of the housing and supported on the bottom wall 59 of the housing where they are run to the nearest electrical or communication wire outlet, at which location they are dropped through the downwardly facing opening 67 and connected to a suitable outlet. By being placed in the aluminum housing 43, the wires 31 are removed from the top of the work surface 17, providing both working and aesthetic advantages. In areas of the work station or office where there are heavy concentrations of wires 31 or where such other devices as surge protectors and multiple outlet strips 33 and other devices are resting on the work surface 17, a metal cover 45 may be hung on the aluminum housing 43 to conceal these devices. The metal cover 45 is supported on the aluminum housing 43 by connecting the hook 97 of the cover into the dovetail groove 81 formed in the top of the housing 43. When so-installed, the cover will extend downwardly and outwardly a few degrees from the vertical to conceal the wires or pieces of equipment resting on the work surface 17. This cover will be easily accessible because it can be opened and lifted up by engaging the bottom tab 95 which extends inwardly and is located a short distance above the work surface 17 when the cover is installed.

The wire management assembly 41 of this invention is also adaptable to any office or work space where there is a supporting surface and a vertical wall behind the supporting surface on which the aluminum housing 43 may be mounted. It can also be installed on the front edge or rear surface of a desk.

While the housing 43 has been described as an aluminum extrusion, it should be understood and appreciated that it may be formed by other means and from other suitable materials.

I claim:

1. A wire management assembly for mounting on office partition panels for supporting and concealing communication wires, power plug-in cords and extension cords of electrical equipment and appliances, including:

a housing having a rear wall, a bottom wall extending from the rear wall above the bottom thereof and having an upturned front lip, a top wall and a front wall forming a wire enclosure, said front wall being located outwardly of said front lip of said bottom wall and extending downwardly from said top wall to terminate in alignment with the upturned front lip of said bottom wall to define a downwardly facing opening into said wire enclosure, said rear wall extending below said bottom wall to form a tab, a rearwardly facing, downwardly opening hook formed integrally with said rear wall of said housing, a clip adapted to support said housing, said clip having a top edge which is received by said hook and a bottom upturned flange which receives the downwardly extending tab of said housing rear wall, at least one bracket which attaches to the rear of the clip, said bracket having a pair of rearwardly extending hooks which fit into slots in the standards to support the clip and housing on the office partition panels.

2. A wire management assembly for mounting on a vertical supporting surface at a defined distance above a horizontal work surface for supporting and concealing communication wires, power plug-in cords and extension cords of electrical equipment and devices, including:

a housing having a rear wall, a bottom wall with an upturned front lip, a top wall and a front wall forming an enclosure, said front wall of said housing located outwardly of said bottom wall and extending outwardly from said top wall to terminate adjacent the upturned lip of said bottom wall to define a downwardly facing opening into said wire enclosure of said housing, a groove formed in said top wall of said housing with said groove having a dovetail-shaped, vertical cross-section, a cover adapted to be supported on said housing and to extend downwardly from said housing to terminate above said work surface, said cover being channel shaped having a top which rests on the top wall of said housing and a front wall which engages and rests on the inclined front wall of the housing and extends downwardly beyond the housing to terminate above said work surface, said top wall of said cover having a hook at its inner side which hooks into and is received in the dovetail-shaped groove in the housing top wall to hingedly lock the cover into position to prevent vertical movement thereof.

3. The wire management assembly of claim 2 in which said hook is curved inwardly at the same angle as the wall of the dovetail-shaped groove to prevent the cover from being removed by being slid directly upwardly.

4. The wire management assembly of claim 2 in which the front wall of said housing and the front wall of said cover are inclined outwardly.

5. A wire management assembly for mounting on a vertical supporting surface at a defined distance above a horizontal work surface for supporting and concealing communication wires, power plug-in cords and extension cords of electrical equipment and devices, including:

a housing having a rear wall, a bottom wall with an upturned front lip, a top wall and a front wall forming an enclosure, said front wall of said housing located outwardly of said bottom wall and expanding downwardly from said top wall to terminate adjacent the upturned lip of said bottom wall to define a downwardly-facing opening into said wire enclosure of said housing, a cover adapted to be supported on said housing, said cover being channel-shaped having a top which rests on the top wall of said housing and a front wall which engages and rests on the front wall of the housing and extends downwardly beyond the housing to terminate above said work surface, and means formed on said housing and said cover to restrain said cover against downwardly and upwardly movement relative to the housing but to release the cover when its bottom is swung outwardly and lifted upwardly.

* * * * *